US011448768B2

(12) United States Patent
Braun et al.

(10) Patent No.: US 11,448,768 B2
(45) Date of Patent: Sep. 20, 2022

(54) METHOD FOR OPERATING A LASER DISTANCE MEASURING DEVICE

(71) Applicant: Robert Bosch GmbH, Stuttgart (DE)

(72) Inventors: Andreas Braun, Fellbach (DE); Stefan Noe, Stuttgart (DE); Bernd Schmidtke, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 306 days.

(21) Appl. No.: 16/635,864

(22) PCT Filed: Aug. 21, 2018

(86) PCT No.: PCT/EP2018/072487
§ 371 (c)(1),
(2) Date: Jan. 31, 2020

(87) PCT Pub. No.: WO2019/048227
PCT Pub. Date: Mar. 14, 2019

(65) Prior Publication Data
US 2020/0371242 A1    Nov. 26, 2020

(30) Foreign Application Priority Data

Sep. 7, 2017   (DE) .............. 10 2017 215 766.6

(51) Int. Cl.
*G01S 17/48*    (2006.01)
*G01S 7/51*    (2006.01)
(Continued)

(52) U.S. Cl.
CPC .......... *G01S 17/894* (2020.01); *G01S 7/4814* (2013.01); *G01S 7/4816* (2013.01); *G01S 7/51* (2013.01); *G01S 17/48* (2013.01)

(58) Field of Classification Search
CPC ........ G01S 7/4816; G01S 7/4814; G01S 7/51; G01S 7/4972; G01S 17/48; G01S 17/894;
(Continued)

(56) References Cited

U.S. PATENT DOCUMENTS 8,531,562 B2 * 9/2013 Schmidt ................... H04N 5/33
348/222.1
9,443,311 B2 * 9/2016 Hallett ..................... G06T 7/521
(Continued)

FOREIGN PATENT DOCUMENTS

DE          100 55 510 A1    5/2002
DE    10 2012 214 880 A1    6/2013
(Continued)

OTHER PUBLICATIONS

International Search Report corresponding to PCT Application No. PCT/EP2018/072487, dated Nov. 8, 2018 (German and English language document) (6 pages).

*Primary Examiner* — Sang H Nguyen
(74) *Attorney, Agent, or Firm* — Maginot, Moore & Beck LLP (57) ABSTRACT

The proposed method for operating a laser distance measuring device, in particular a hand-held laser distance measuring device, is based on a method in which laser radiation is emitted to a target point by means of an emitter unit, laser radiation reflected back from the target point is detected by a receiver unit with a detection surface, at least one image of at least one target environment of the target point is captured by at least one camera, and a representation of the image, overlaid with a marking of the target point, is displayed on a screen of the laser distance measuring device. According to the disclosure, a parallax error in the representation of the image, overlaid with a marking of the target point, is corrected according to an estimated distance to the (Continued)

target point. The disclosure also relates to a corresponding laser distance measuring device.

14 Claims, 4 Drawing Sheets

(51) Int. Cl.
  *G01S 17/894* (2020.01)
  *G01S 7/481* (2006.01)
(58) Field of Classification Search
  CPC ........ G01S 17/86; G01S 17/08; G01S 17/023; G01S 17/89
  See application file for complete search history.

(56) References Cited

U.S. PATENT DOCUMENTS

| | | | |
|---|---|---|---|
| 9,600,863 B2* | 3/2017 | Xiong | G06T 7/33 |
| 2003/0163042 A1* | 8/2003 | Salmon | G01S 13/887 |
| | | | 600/436 |
| 2011/0288818 A1* | 11/2011 | Thierman | G01B 17/00 |
| | | | 702/155 |
| 2014/0204361 A1* | 7/2014 | Sisney | G01C 3/08 |
| | | | 356/5.01 |
| 2015/0009335 A1* | 1/2015 | Strandemar | H04N 5/33 |
| | | | 348/164 |
| 2015/0109407 A1* | 4/2015 | Giger | G01S 17/46 |
| | | | 348/36 |
| 2016/0003944 A1* | 1/2016 | Schmidtke | G01S 7/481 |
| | | | 356/4.07 |
| 2017/0074975 A1* | 3/2017 | Schmidtke | G01S 17/10 |

FOREIGN PATENT DOCUMENTS

| | | |
|---|---|---|
| DE | 10 2015 223 024 A1 | 5/2017 |
| EP | 1 628 141 A1 | 2/2006 |
| EP | 2 669 707 A1 | 12/2013 |
| EP | 3 015 881 A2 | 5/2016 |
| WO | 03/008909 A1 | 1/2003 |

* cited by examiner

METHOD FOR OPERATING A LASER DISTANCE MEASURING DEVICE

This application is a 35 U.S.C. § 371 National Stage Application of PCT/EP2018/072487, filed on Aug. 21, 2018, which claims the benefit of priority to Serial No. DE 10 2017 215 766.6, filed on Sep. 7, 2017 in Germany, the disclosures of which are incorporated herein by reference in their entirety.

BACKGROUND

The present disclosure relates to a method for operating a laser distance measurement device, in particular a hand-held laser distance measurement device.

Methods for operating laser distance measurement devices have already been proposed, for example in DE 10 2012 214 880 A1 or in EP 2669707 A1.

SUMMARY

The proposed method for operating a laser distance measurement device, in particular a hand-held laser distance measurement device, is based on a method in which laser radiation is emitted to a target point by way of a transmission apparatus, laser radiation reflected from the target point is acquired by way of a reception apparatus having a detection surface, at least one camera is used to acquire at least one image of at least one target environment of the target point, and a display of the image overlaid with a marker of the target point is output on a screen of the laser distance measurement device. According to the disclosure, a parallax error in the display of the image overlaid with the marker of the target point is corrected depending on an estimated distance from the target point.

The laser distance measurement device, in particular its functional components the transmission apparatus, the reception apparatus and the computing unit, is intended to emit temporally modulated laser radiation in the form of a laser beam in the direction of a target object whose distance from the measurement device is intended to be determined. The point at which the emitted laser beam meets the target object is called 'target point' hereinafter. The direction in three-dimensional space in which the laser beam is emitted onto the target object is referred to as distance measurement direction hereinafter. With respect to the laser distance measurement device, the distance measurement direction is defined by construction, in particular by the arrangement of the transmission apparatus in a housing of the laser distance measurement device. The terms 'laser radiation' and 'laser beam' are used synonymously in the following text. The concepts of laser distance measurement are familiar to those skilled in the art.

'Provided' or 'intended' in the following text should be specifically understood to mean 'programmed', 'configured', 'designed' and/or 'equipped'. An object being 'intended' for a particular function should be understood in particular to mean that the object performs and/or executes this particular function in at least one application state and/or operating state, or is configured to perform the function.

Laser radiation that is reflected or scattered, that is to say radiated back, from the aimed-at target object is at least partly detected by the laser distance measurement device, in particular by the reception apparatus of the laser distance measurement device, and used to determine the precise distance to be measured in the distance measurement direction. The reception apparatus is in this case designed to detect reflected laser radiation and has at least one two-dimensional detection surface having a multiplicity of pixels. Each pixel is intended to produce a detection signal depending on an incident light intensity of reflected laser radiation and output it for further processing, in particular to the computing unit or to a control device of the laser distance measurement device. 'Pixels' are understood to mean laser radiation-sensitive elements such as photodiodes, for example PIN diodes or avalanche photodiodes (APD) or the like. In one embodiment of the laser distance measurement device, the detection surface is formed by a two-dimensional arrangement ('array') of a multiplicity of single-photon avalanche diodes (SPADs). By way of example, the detection surface may consist of 32×32 SPADs arranged in a matrix.

The laser distance measurement device is used for the contactless measurement of a distance from the target point. From a phase comparison, performed by way of the computing unit or by way of the reception apparatus, between the emitted laser radiation and the laser radiation reflected from the surface of the target object, it is possible to determine a light propagation time and to establish the sought distance between the laser distance measurement device and the target object, in particular between the laser distance measurement device and the target point in the corresponding distance measurement direction, using the speed of light. As an alternative, the light propagation time may also be determined by establishing the time of flight, as is known to those skilled in the art. The distance that is determined, that is to say the distance measurement value, may then subsequently be processed further by way of an evaluation or control device of the laser distance measurement device and/or be output, using an output device such as a screen, to a user of the laser distance measurement device.

In one embodiment, the laser distance measurement device is embodied as a hand-held measurement device that is able to be guided just using the hands, preferably using one hand, without the additional help of a transport and/or holding device. To this end, the overall weight of the laser distance measurement device is in particular less than 500 g, preferably less than 300 g, particularly preferably less than 200 g. In one embodiment of the laser distance measurement device, all of the components of the measurement device are accommodated in a housing substantially enclosing the components. In particular, the length of the longest side of this housing is less than 30 cm, preferably less than 20 cm, particularly preferably less than 15 cm.

According to the disclosure, the laser distance measurement device has a camera for acquiring at least one image of a target environment of a respectively aimed-at target point. In one embodiment, the camera may be embodied as a CCD chip or another image acquisition means, in particular one that is sensitive in the visual spectrum. In one embodiment of the camera, said camera is configured as a fixed-focus camera, that is to say the camera optics have an invariable focus. As an alternative, the camera may be embodied as an automatically focusing camera. In one embodiment, the camera has a fixed magnification or zoom level. As an alternative, the camera may also have a zoom functionality. An image at least of the target environment of the target point is able to be captured by way of the camera. The target environment around the corresponding target point is in this case in particular defined by that spatial or acquisition angle at which light is gathered by way of the optics of the camera and converted into an image. In one embodiment, the image of the target environment of a target point may be changed, in particular shrunk or magnified, using beam-forming and/or beam-deflecting optical elements, in particular for example using lenses, diffractive elements, mirrors or the like. As an alternative or in addition thereto, the image of the target environment of a target point may also be changed with the aid of software, in particular magnified or shrunk. It is pointed out at this juncture that part of the image captured of the target environment of a target point also again itself constitutes an image of the target environment of the target point. In the context of this document, each partial section of an image of the target environment of a target point therefore itself also counts as an image of the target environment of the target point.

The laser distance measurement device has a screen, an image acquired using the camera or a partial area of an image being able to be displayed by way of the screen. In this case, during operation of the laser distance measurement device, at least one marker is able to be displayed overlaid on or inserted onto the image, which marker identifies or marks the target point at which the laser beam meets the target object in the output image, in particular the output partial region of the image.

The laser distance measurement device furthermore has a computing unit. The computing unit in particular has components that comprise at least a processor, a memory and an operating program with evaluation and calculation routines. In particular, the electronic components of the computing unit may be arranged on a board or printed circuit board. In one embodiment, the computing unit is configured integrally with a control device of the laser distance measurement device. In one embodiment, the computing unit is configured in the form of a microcontroller. The computing unit is intended and set up to calculate a distance from a distance measurement by way of the transmission apparatus and the reception apparatus. Furthermore, the computing unit is also intended and set up to perform the method according to the disclosure. In particular, the computing unit is intended to produce a display in which an image, acquired using the camera, of the target environment of the target point is marked with a marker of the target point. In this case, the marker is to be understood as a marker that is inserted into the image or inserted onto the image and that clearly marks and therefore highlights the target point in the image, in particular the position of the target point in the image. In particular, the marker may for example be embodied as a crosshair, a square, a circle or the like. The computing unit is therefore intended and set up to calculate the position of the target point in the image and thus incorporate the marker at the position of the calculated target point. In one embodiment, the computing unit calculates the position of the target point in the image as pixel coordinates. In one embodiment, the computing unit calculates the position of the target point from geometric values of the laser distance measurement device, in particular from a geometric reference of the camera and of the transmission apparatus, more precisely from a geometric reference of the direction in which the camera acquires an image, the distance measurement direction in which the target point is projected, and the distance ('base distance') of the camera and the transmission apparatus, in particular a laser diode of the transmission apparatus, in the laser distance measurement device. The computing unit is furthermore intended to output the dataset produced by overlaying the image with the marker on a screen of the laser distance measurement device, using which a corresponding display, again in the form of an image, is output to an operator of the laser distance measurement device. According to the disclosure, the computing unit is intended and set up to correct a parallax error in the dataset, that is to say in the display of the image overlaid with the marker of the target point, depending on an estimated distance to the target point. It is pointed out that the computing unit retains all of the values required to perform the method according to the disclosure, such as base distance or the like, internally in the device, in particular in a non-volatile, non-erasable memory.

The method according to the disclosure for operating the laser distance measurement device is used for example in a scenario in which a user of the laser distance measurement device wishes to perform a measurement of a distance to an object at a large distance, the target object. It may be the case here, in particular in a bright outdoor area, that the target point is not discernible to the eye on account of the great distance. The laser distance measurement device according to the disclosure therefore displays, on its screen, the target point overlaid on and in the image acquired using the camera of the target environment of the target point. In this way, the operator of the laser distance measurement device is able to find the position of the target point, that is to say the direction in which the distance is established by way of laser distance measurement, in spite of the great distance. If the operator wishes for example to establish a distance to a wooden post, then he is able to view an image of the wooden post or, depending on the distance and zoom level of the camera optics, a section thereof on the screen. In this case, the target point—typically a red point produced by red laser radiation—is likewise acquired by the camera and output on the screen. Furthermore, the calculated position of the target point is inserted into the image as a marker, in particular as a crosshair. Should the operator then no longer be able to discern the target point with the naked eye—either directly on the target object or on the display, output by the screen, of the image—he is then able to point the laser distance measurement device, in particular the emitted laser beam, at the wooden post using the output image overlaid with the marker of the target point. The laser distance measurement device therefore has a virtual optical targeting apparatus for improving the visibility of the target point in the display, output on the screen, of the image acquired using the camera. The targeting apparatus allows certain handling of the laser distance measurement device with regard to erroneous measurements caused by erroneous aiming at a target object.

On account of the spaced-apart arrangement of the transmission apparatus, in particular a laser diode, and the camera in the housing of the laser distance measurement device, a parallax error is caused. The 'parallax error' is in this case the angle produced between the optical axis of the transmission apparatus and the optical axis of the camera, both axes being directed from different starting points—that is to say the laser diode and the camera (spaced apart by the 'base distance')—onto the same point—the target point. The parallax error is distance-dependent. In other words, the parallax error is considered to be the (distance-dependent) angle at which the base distance appears to be from the target point. In the implementation of the laser distance measurement device explained above, the parallax error causes incorrect or at least inaccurate positioning of the marker in the display, output on the screen, of the image overlaid with the marker of the target point. Although the position of the marker of the target point with respect to the image (that is to say in the overlaid display, output on the screen, of the image) matches the actual position, discernible in the image, of the depicted target point (in corresponding light conditions) for very great distances (for example 100 meters) (small parallax error), this match matches increasingly less as the distances become smaller (or in principle also possible in the other direction: large distance—large deviation, small distance—small deviation). With smaller distances between the laser distance measurement device and the target object, the parallax error increases. The marker of the target point with respect to the image therefore drifts increasingly away, for increasingly small distances, from the actual position, discernible in the image, of the depicted target point in the direction of a parallax vector (large parallax error). The parallax vector points in the direction of the base distance as defined by construction.

The construction-defined parallax error is therefore expressed in the laser distance measurement device according to the disclosure in a distance-dependent lateral offset between the relative position of the image output by the screen and the output marker, overlaid on the image, of the target point with respect one another. According to the disclosure, the parallax error in the display of the image overlaid with the marker of the target point is corrected depending on an estimated distance to the target point. 'Estimated distance' should be understood here to mean in particular not the precise distance determined or to be determined and that is able to be determined from a phase comparison performed between the emitted laser radiation and the laser radiation reflected from the surface of the target object or that is able to be determined from establishing the time of flight. The estimated distance is rather an in particular inaccurate or imprecise distance value determined for example before performing the actual distance measurement. The estimated distance may be determined in various ways using the laser distance measurement device in various embodiments of the laser distance measurement device. 'Correct parallax errors' should be understood to mean in particular that said lateral offset between the relative position of the image output by the screen and the output marker, overlaid on the image, of the target point is adjusted, in particular corrected or calculated out, depending on an estimated distance to the target point. In one embodiment of the method, the parallax error in the display of the image overlaid with the marker of the target point is corrected by adjusting the relative position of the output image and of the marker with respect to one another. Using the computing unit, for example a lateral offset that has to be applied for the correction is initially calculated using trigonometric functions from the estimated distance and the base distance specific to the device and converted into a correction value on the pixel plane (pixel coordinates) of the image. The relative position of the output image and of the marker with respect to one another is then able to be influenced and corrected in the context of an image processing algorithm performed by the computing unit. In one embodiment, the position of the output image may be shifted in relation to the marker, and an image section may in particular be changed and/or shifted. This implementation is made available to an operator of the laser distance measurement device for example such that the target point is always situated in the midpoint of the display output on the screen—in one embodiment additionally marked with a marker (marker remains unchanged in the center of the screen; image (section) is shifted). As an alternative or in addition, the position of the marker may also be adjusted and shifted in relation to the display, output on the screen, of the image. This implementation is made available to an operator of the laser distance measurement device for example such that a marker of the image point "migrates" to one side of the screen for increasingly small distances (marker does not remain in the center of the screen). A situation is thus advantageously achieved whereby the position of the marker of the target point with respect to the image (that is to say in the overlaid display, output on the screen, of the image) matches the actual position, discernible in the image, of the depicted target point (in corresponding light conditions) for any desired distance of laser distance measurement device and target object with respect to one another. There may furthermore be provision in one embodiment to deactivate the incorporation, that is to say the overlaid display of image and marker, for distances below a predefined threshold value (for example for distances below 5 meters).

On the basis of the method according to the disclosure, it is possible to provide particularly intuitive and thus simple operation of the laser distance measurement device by the user. Incorrect operation of the laser distance measurement device, in particular incorrectly performed alignment of the laser distance measurement device, is able to be avoided.

In one embodiment of the method for operating the laser distance measurement device, the display of the image overlaid with the marker is output in real time, in particular synchronously with a movement of the laser distance measurement device. In this way, during the movement of the laser distance measurement device by the user, a current image of the target environment, aimed at at the given time, of the currently aimed-at target point is always output. At the same time as the updated outputting of the image, the marker of the target point in the display is also updated and therefore displayed in a manner corrected depending on distance. 'In real time' and 'synchronously with a movement of the laser distance measurement device' should in particular be understood to mean, in this connection, that the processing speed of the computing unit is so high that repositioning of the laser distance measurement device in space by the user results immediately in a change of the displayed image, in particular overlaid with the marker. In this way, the user of the laser distance measurement device may immediately, that is to say 'synchronously', associate a movement in space executed using the laser distance measurement device with a change in the output image including the marker.

Using firstly the "estimated distance" as a basis for correcting the parallax error allows such a high processing speed that permits outputting in real time, in particular synchronously with a movement of the laser distance measurement device. In particular, according to the disclosure, a computational power for performing the method is able to be kept low, since estimated distances are able to be obtained using simpler means, in particular based on lower computational powers. Whereas for example calculating a phase comparison places high requirements on a computing unit with regard to computational power, determining an estimated distance by determining a position of the light spot brought about by the reflected laser radiation on the detection service requires only a very low computational power. It is furthermore possible to speed up the performance of the method by significantly simplifying the method. Whereas a typical distance measurement based on a phase comparison performed between the emitted laser radiation and the laser radiation reflected from the surface of the target object or based on establishing a time of flight is possible at a temporal repetition rate of 10 Hz, this repetition rate is able to be significantly increased using the estimated distance. By way of example, a repetition rate may be increased to far beyond 20 Hz, in particular 30 Hz or 40 Hz or even more. The output of the display of the image then appears to be delay-free to an operator of the laser distance measurement device with respect to a movement of the laser distance measurement device, that is to say actually synchronous, whereas, in the case of a repetition rate of for example 10 Hz, readily discernible "trailing" of the marker in the display is visible with respect to the actually discernible target point in the image. By virtue of a high processing rate, the user of the laser distance measurement device may get the impression that image data are evaluated immediately for a target area aimed at by the laser distance measurement device, in particular a target environment of a target point, and the marker is displayed immediately in correct form.

Outputting the display of the image overlaid with the marker 'in real time' may then be assumed if the processing time internal to the device until outputting is complete is in particular less than 0.5 seconds, preferably less than 0.1 seconds, particularly preferably less than 0.05 seconds. The user of the laser distance measurement device is thereby able to discern the target point at which the laser distance measurement device is aimed particularly quickly, without a delay and thus reliably. A particularly efficient and intuitively operable laser distance measurement device with high operator comfort may thus advantageously be provided.

In one embodiment of the method, the estimated distance is determined from a position of the light spot brought about by the reflected laser radiation on the detection surface. The computing unit is in this case in particular intended and set up to determine the distance of the target point as an estimated distance from the determined position of the light spot brought about by the reflected laser radiation on the detection surface in accordance with the triangulation principle. For this purpose, the computing unit uses a base distance from the detection surface to the transmission apparatus, in particular a laser diode, as well as trigonometric functions. The smaller the distance to the target object, the more the light spot "migrates" on the detection surface on the axis (parallax vector) that is given as the line of intersection of the parallax plane and detection surface. The parallax plane in this case represents the plane that is spanned by the detection surface midpoint, the laser diode and the distance measurement direction. The position may be established in one embodiment by establishing the center of gravity of the coordinates of those pixels of the detection surface that are illuminated by the light spot. As an alternative or in addition, the position may also be determined by determining at least one pixel illuminated by the light spot.

In one embodiment of the method, the estimated distance is determined from a size of the light spot brought about by the reflected laser radiation on the detection surface. In this case, the estimated distance is determined from the size of the light spot, in particular the diameter thereof, by way of a known focal length and image width of the reception optics of the reception apparatus. The computing unit is in particular intended to establish an estimated distance of the target object from the size, in particular the shape, preferably the diameter of the light spot on the detection surface. In one embodiment of the method, the size of the light spot is determined from the surface area covered by the light spot on the detection surface. In an alternative or additional embodiment of the method, the size of the light spot is determined from the length of a section of the surface area covered by the light spot on the detection surface. The section may in this case for example correspond to a chord (in the case of a light spot assumed to be substantially circular) and/or to the diameter of the surface area covered by the light spot. In one embodiment of the method, the size of the light spot is determined from the number of illuminated pixels of that pixel row of the detection surface that lies substantially in the parallax plane, in particular runs substantially collinear to the direction of a beam displacement with respect to the detection surface for different distances to the target point. This is suitable in particular when a pixel row of the detection surface lies in the parallax plane as defined by construction. By reading the measured values of a pixel row of the detection surface, it is thus particularly quickly and easily possible to determine a diameter or at least a chord of the light spot—both representative of the size of the light spot—and to establish an estimated distance therefrom.

It is pointed out that determining the position or the size of the light spot in the case of a laser distance measurement device having a detection surface is performed as standard in order already to determine those pixels of the detection surface that need to be used in the distance measurement (reducing the signal-to-noise ratio). A particularly resource-saving embodiment of the method is thus able to be specified in this way.

In one embodiment, the evaluation of the position of the light spot brought about by the reflected radiation on the detection surface and the evaluation of the size of the light spot brought about by the reflected laser radiation on the detection surface may be used in order to increase the accuracy of the estimated distance. By way of example, an averaged estimated distance may be established in order to correct the parallax error.

In one embodiment of the method, the estimated distance is determined from a radiometric measured value. The radiometric measured value may in this case be evaluated in order to draw conclusions as to the estimated distance from the target object to the laser distance measurement device. In one embodiment of the method, the radiometric measured value describes a signal amplitude of the reflected laser radiation received by the detection surface.

This signal amplitude is in direct proportion to the distance from the target object to the laser distance measurement device and may therefore advantageously be used to determine the estimated distance in a particularly simple manner. It is particularly quick to read the detection surface following a maximum value in the signal amplitude that is characteristic of the reflected laser radiation. The signal amplitude may in this case concern the power (watts), received by the detection surface, of the laser radiation and/or a counting rate or the like. Comparing the received value with a reference value that is obtained in an (initial or previous) distance measurement therefore makes it possible to convert the signal amplitude into an estimated distance. As an alternative or in addition, in one embodiment of the method, the radiometric measured value may describe a signal-to-noise ratio of the reflected laser radiation received by the detection surface. The signal-to-noise ratio may in this case likewise be obtained particularly easily directly from the measured values produced by the detection surface.

Furthermore, a laser distance measurement device according to the disclosure, in particular a laser distance measurement device, for performing the method according to the disclosure is proposed. The laser distance measurement device has, as described, at least one transmission apparatus for emitting laser radiation to the target point, a reception apparatus having a detection surface for acquiring laser radiation reflected by the target point, a camera for acquiring at least one image of at least one target environment of the target point, a screen for outputting a display of the image overlaid with a marker of the target point, and a computing unit for performing the method according to the disclosure.

BRIEF DESCRIPTION OF THE DRAWINGS

The disclosure is explained in more detail in the following description with reference to exemplary embodiments illustrated in the drawings. The drawings and the description contain numerous features in combination. A person skilled in the art will expediently also consider the features individually and combine them to form feasible further combinations. Identical reference signs in the figures refer to identical elements.

In the figures.

DETAILED DESCRIPTION

Figure 1:
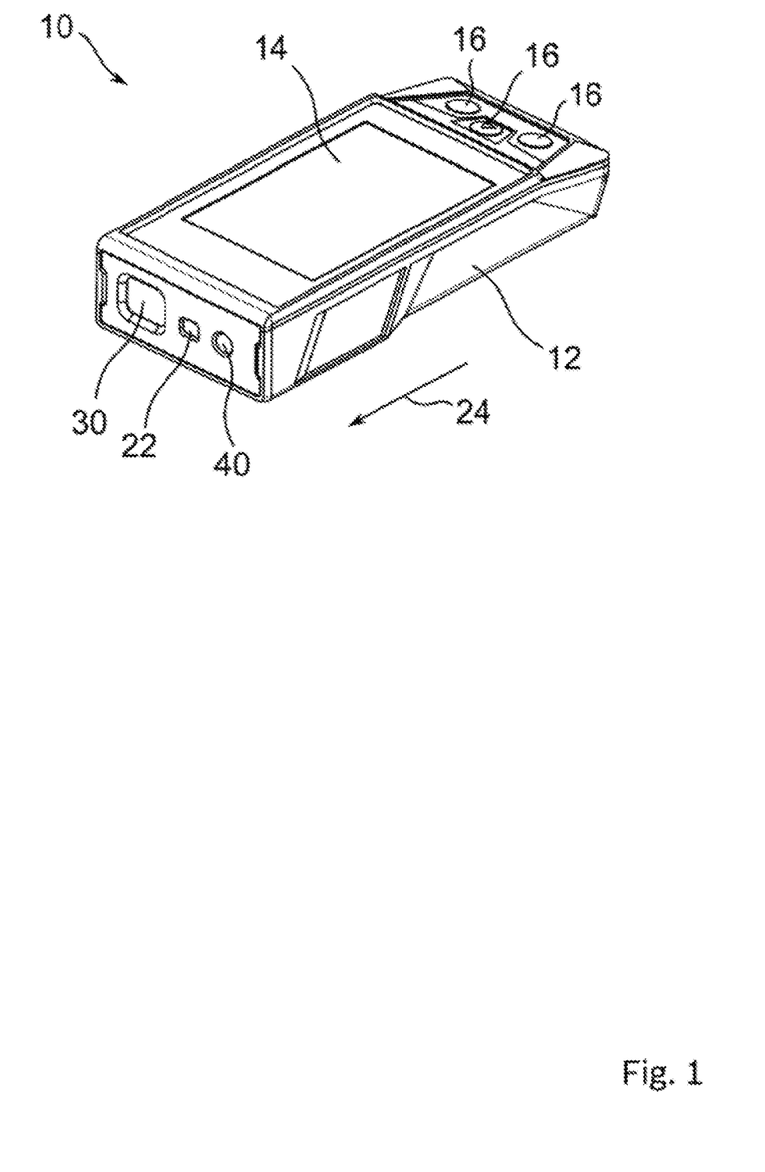
FIG. 1 shows a perspective view of one refinement of the laser distance measurement device according to the disclosure.

FIG. 1 shows a perspective illustration of one exemplary embodiment of a hand-held laser distance measurement device 10, which has a housing 12, a screen 14 and activation elements 16 for turning on and turning off the laser distance measurement device 10 and for starting or configuring a measurement process. To measure the distance from the laser distance measurement device 10 to a target object 18 (cf. FIG. 2), during operation of the laser distance measurement device 10, parallel laser radiation 20 (illustrated by two beams defining the laser radiation, cf. FIG. 2a, 3a) is transmitted in the direction of the target object 18 via transmission optics 22 consisting for example of a lens system, not illustrated in more detail. The direction in which the laser distance measurement device 10 emits laser radiation is called distance measurement direction 24 hereinafter. The transmission optics 22 and a collimating laser diode 26 (cf. FIG. 2a, 3a) form part of the transmission apparatus of the laser distance measurement device 10. The laser radiation 28 (likewise illustrated by two beams defining the reflected laser radiation, cf. FIG. 2a, 3a) reflected from a surface of the target object 18 is routed via reception optics 30 (here in the form of a lens) onto a two-dimensional detection surface 32 and is detected there (cf. FIGS. 2a, 2b and FIGS. 3a, 3b). The two-dimensional detection surface 32 is formed for example as a two-dimensional arrangement ('array') of 17×17 single-photon avalanche diodes 34 (SPADs) as pixels arranged in a matrix (pixel is equated to SPAD hereinafter), each SPAD 34 being intended to produce a detection signal depending on an incident light intensity of reflected laser radiation 28 and to output it for further processing, in particular to a computing unit, not illustrated in more detail, or to a control device, not illustrated in more detail, of the laser distance measurement device 10. The reception optics 30 and the detection surface 32 form part of a reception apparatus 36. From a phase comparison performed between the emitted laser radiation 20 and the laser radiation 28 reflected from the surface of the target object 18, a light propagation time is able to be determined and the sought distance between the laser distance measurement device 10 and the target object 18 in the distance measurement direction 24 is able to be established using the speed of light. The laser radiation 20, 28 is embodied as red laser light in this exemplary embodiment. The emitted laser radiation 20 produces a projected laser point, what is called the target point 38, on the target object 18.

The laser distance measurement device 10 furthermore has a camera 40 that is intended to capture at least one image 42, 42a, 42b of a target environment 44 (represented by a reception cone from which light is received by the camera 40 in FIGS. 2a and 3a) of the target point 38. In this case, the camera 40 is accommodated in the laser distance measurement device 10, in particular accommodated in the housing 12 of the laser distance measurement device 10, such that it is aligned in the distance measurement direction 24. The camera 40 is thus accommodated in a fixed position in the housing 12 with respect to the housing 12. The camera 40 is embodied as a CCD chip and constitutes a fixed-focus camera.

The laser distance measurement device 10, for its power supply, has a power supply device, not illustrated in more detail, in particular a battery or a rechargeable battery, preferably a lithium ion rechargeable battery.

Furthermore, the laser distance measurement device 10 has components that are not illustrated in more detail in the figures. These comprise at least one computing unit. The computing unit in particular has components that comprise at least a processor, a memory and an operating program with evaluation and calculation routines. The computing unit is intended to calculate a distance from a distance measurement and to produce a display 46, 46a, 46b in which an image 42, 42a, 42b, acquired using the camera 40, of the target environment 44 of the target point 38 is marked overlaid with a marker 48, 48a, 48b of the target point 38 (cf. FIGS. 2sc and 3sc), here a crosshair. The marker 48, 48a, 48b is inserted into the image 42, 42a, 42b and marks the target point 38 in the image 42, 42a, 42b. The computing unit is intended to calculate the position at which the marker 48, 48a, 48b should be placed for a captured image 42, 42a, 42b and thus to insert the marker 48, 48a, 48b at the position of the calculated target point 38. The computing unit is furthermore intended to output the dataset (that is to say the display 46, 46a, 46b) produced by overlaying the image 42, 42a, 42b with the marker 48, 48a, 48b on the screen 14 of the laser distance measurement device 10. By way of the screen 14, the corresponding display 46, 46a, 46b is in turn output in the form of an image to an operator of the laser distance measurement device 10. The computing unit is furthermore intended and set up to correct a parallax error in the dataset, that is to say in the display 46, 46a, 46b of the image 42, 42a, 42b overlaid with the marker 48, 48a, 48b of the target point 38, depending on an estimated distance to the target point 38. The computing unit has all of the values required to perform the method according to the disclosure, such as base distances or the like.

Figure 2:
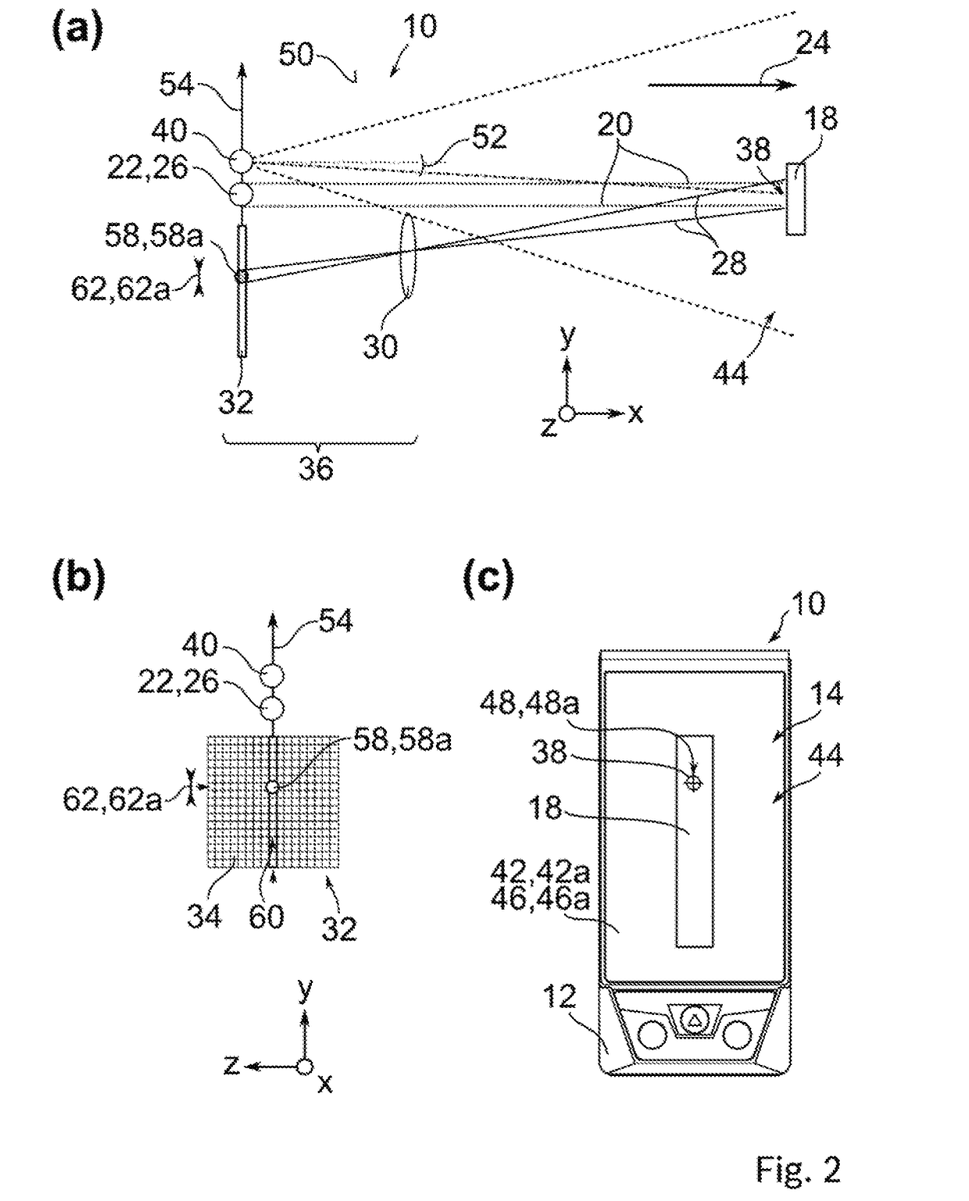
FIG. 2a shows a schematic side view of the geometric ratios of the of the beam optics in the case of a comparatively great distance between the laser distance measurement device and target object.
FIG. 2b shows a schematic view of the detection surface of the laser distance measurement device including light spot in the case of a comparatively great distance between the laser distance measurement device and target object.
FIG. 2c shows a schematic view of one embodiment of the laser distance measurement device with a display, output on the screen, of an image of the target environment of the target point overlaid with a marker of the target point in the case of a comparatively great distance between the laser distance measurement device and target object.
Figure 3:
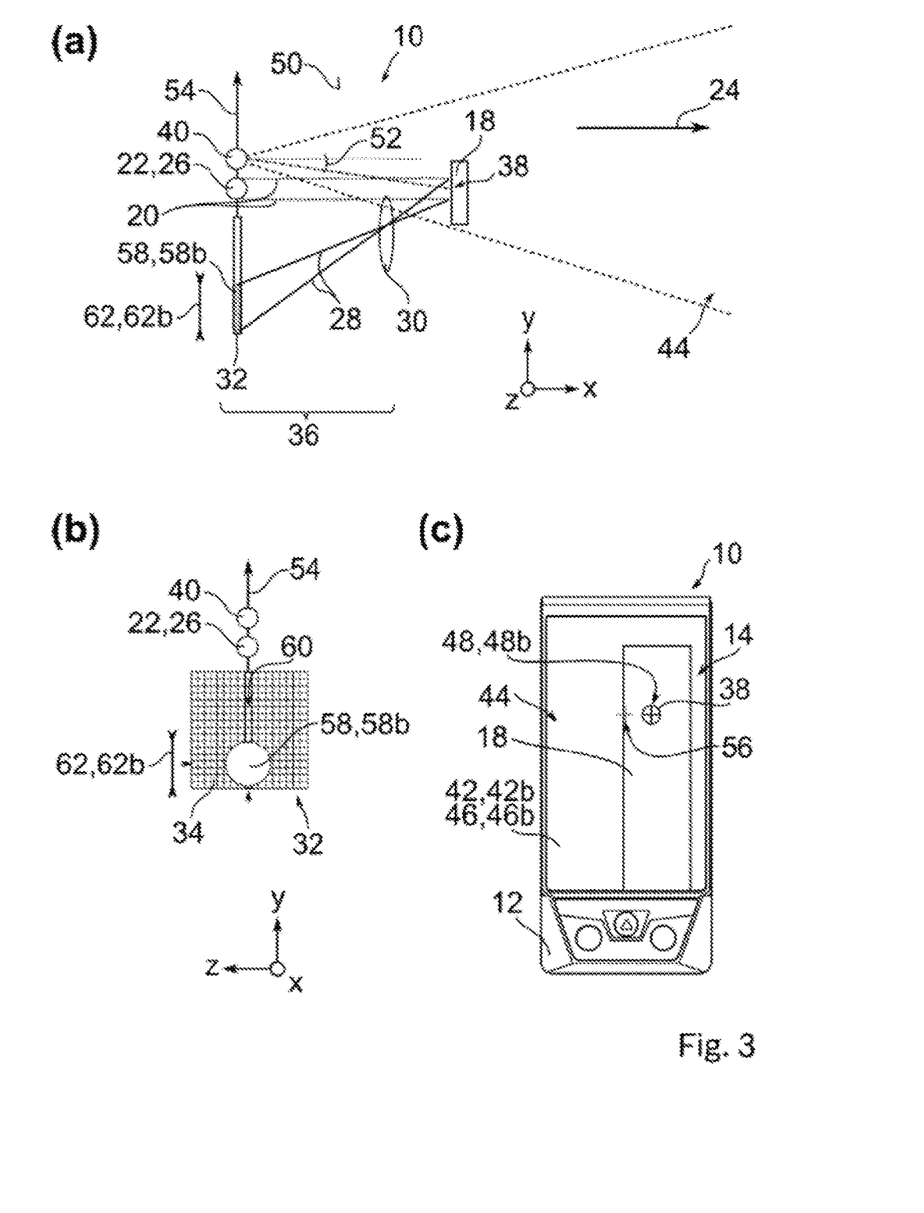
FIG. 3a shows a schematic side view of the geometric ratios of the of the beam optics in the case of a comparatively small distance between the laser distance measurement device and target object.
FIG. 3b shows a schematic view of the detection surface of the laser distance measurement device including light spot in the case of a comparatively small distance between the laser distance measurement device and target object.
FIG. 3c shows a schematic view of one embodiment of the laser distance measurement device with a display, output on the screen, of an image of the target environment of the target point overlaid with a marker of the target point in the case of a comparatively small distance between the laser distance measurement device and target object.

FIGS. 2a and 3a schematically illustrate the geometric conditions on which the method is based, a beam optics model being used for explanation. FIGS. 2a and 3a each show a side view of the optical components, internal to the device, of the laser distance measurement device 10, of a target object 18 and of the optical paths in the transmission and reception path of the laser distance measurement device 10. FIGS. 2b and 3b each show a view of the optical components, internal to the device, of the laser distance measurement device 10 as they appear from the target point 38 (without considering the housing 12). Although a distance between the laser distance measurement device 10 and the target object 18 is comparatively great in FIG. 2 (part a, b, c), said distance is comparatively small in FIG. 3 (part a, b, c). The following description relates to both FIGS. 2 and 3.

The laser diode 26, which is part of the transmission apparatus, emits laser radiation 20 in the distance measurement direction 24. The laser radiation 20 is reflected or scattered from the target object 18 and returns to the laser distance measurement device 10 as reflected laser radiation 28. The detection surface 32 of the laser distance measurement device 10 serves to acquire the laser radiation 28 reflected from the target object 18. The camera 40 is situated in a parallax plane 50 with the laser diode 26 and the detection surface 32. The camera 40 acquires an image 42, 42a, 42b of a target environment 44 of the target point 38, illustrated in FIG. 2c for a measurement scenario as illustrated in FIG. 2a (great distance) and illustrated in FIG. 3c for a measurement scenario as illustrated in FIG. 3a (small distance). Due to the spaced-apart arrangement of the laser diode 26 and the camera 40, a distance-dependent parallel error is caused, shown here by the parallax angle 52. The distance-dependent parallax error has the effect—as able to be seen by looking at FIGS. 2 and 3 together—that, for comparatively great distances (FIG. 2), the position of the marker 48, 48a of the target point 38 with respect to the image 42, 42a (that is to say in the overlaid display 46, 46a output on the screen in FIG. 2c) matches the actual position, able to be discerned in the image 42, 42a, of the detected target point 38 (in corresponding lighting conditions), cf. in particular FIG. 2c (small parallax error). In contrast thereto, an uncorrected marker 56 of the target point 38 with respect to the image 42, 42b deviates greatly from the actual position, able to be discerned in the image 42, 42b, of the depicted target point 38 in the direction of a parallax vector 54 for relatively small distances (FIG. 3c) (lateral offset between the relative position of image 42, 42b output by the screen 14 and uncorrected marker 56, output overlaid with the image 42, 42b, of the target point 38 with respect to one another). FIG. 3c furthermore illustrates the marker 48, 48b, corrected by the parallax error by way of the method according to the disclosure, overlaid with the image 42, 42b. In this case, the position of the marker 48, 48b is adjusted, that is to say correspondingly shifted, in relation to the display 46, 46b, output on the screen 14, of the image 42, 42b.

The computing unit of the laser distance measurement device 10, in order to perform the distance-dependent parallax correction, establishes an estimated distance from a position of the light spot 58, 58a, 58b brought about by the reflected laser beam 28 on the detection surface 32 by way of triangulation. The position (pixel coordinates) is illustrated in FIG. 2b and FIG. 3b by small arrows at the edge of the detection surface 32 and is established by establishing the center of gravity of the coordinates of the SPADs 34 of the detection surface 32 that are illuminated by the light spot 58, 58a, 58b. The computing unit additionally establishes an estimated distance from a size of the light spot 58, 58a, 58b brought about by the reflected laser radiation 28 on the detection surface 32. The computing unit in particular establishes an estimated distance from a size of the light spot 58, 58a, 58b from the number of illuminated SPADs 34 of that pixel row 60 of the detection surface 32 that lies substantially in the parallax plane 50, in particular parallel or collinear to the parallax vector 54.

Figure 4:
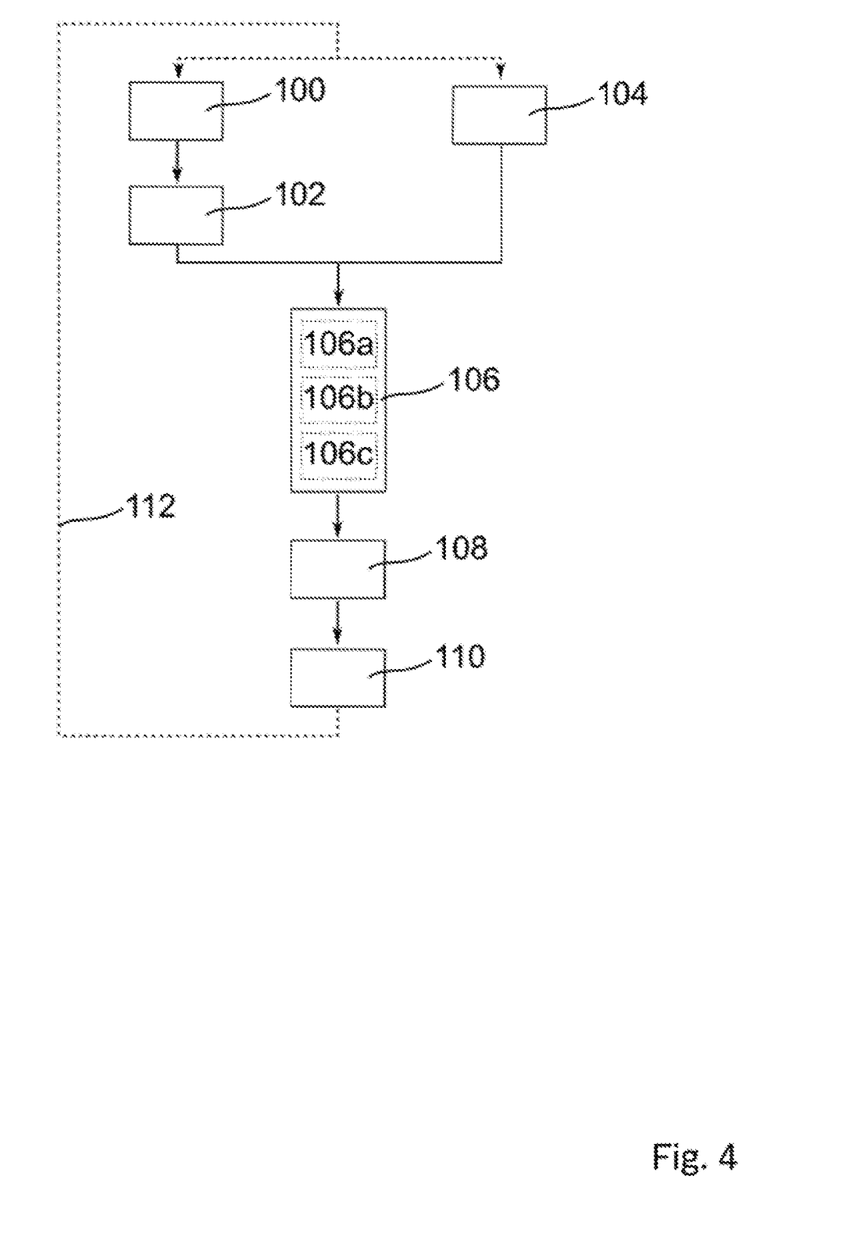
FIG. 4 shows a schematic illustration of the method according to the disclosure in a method diagram.

FIG. 4 illustrates one embodiment of the method according to the disclosure with reference to a method diagram. In method step 100, a transmission apparatus emits laser radiation 20 to a target point 38. In method step 102, laser radiation 28 reflected from the target point 38 is acquired by way of the detection surface 32 of the reception apparatus 36. In method step 104, at substantially the same time, the camera 40 acquires at least one image 42, 42a, 42b of the target environment 44 of the target point 38. In method step 106, an estimated distance to the target point 38 is determined. The estimated distance may be determined from the position of the light spot 58, 58a, 58b brought about by the reflected laser radiation 28 on the detection surface 32 (option 106a, cf. description with regard to FIGS. 2 and 3). As an alternative or in addition, the estimated distance may be determined from the size of the light spot 58, 58a, 58b brought about by the reflected laser radiation 28 on the detection surface 32. The size of the light spot 58, 58a, 58b may in particular be determined from the surface area covered by the light spot 58, 58a, 58b, on the detection surface 32. As an alternative or in addition, the size of the light spot 58, 58a, 58b may be determined from the length 62, 62a, 62b of a section of the surface area covered by the light spot 58, 58a, 58b on the detection surface 32 (option 106b, cf. description with regard to FIGS. 2 and 3). As an alternative or in addition, the estimated distance may also be determined from a radiometric measured value, in particular from a signal amplitude of the reflected laser radiation 28 received by the detection surface 32 and/or from a signal-to-noise ratio of the reflected laser radiation 28 received by the detection surface 32 (option 106c).

In method step 108, the parallax error in the display of the image 42, 42a, 42b overlaid with the marker 48, 48a, 48b of the target point 38 is corrected by adjusting the relative position of the output image 42, 42a, 42b and of the displayed marker 48, 48a, 48b with respect to one another. Finally, in method step 110, the display 46, 46a, 46b of the image 42, 42a, 42b overlaid with the marker 48, 48a, 48b of the target point 38 is output on a screen 14 of the laser distance measurement device 10.

The method runs repeatedly, illustrated by the arrow 112.

The invention claimed is:

1. A method for operating a laser distance measurement device, the method comprising:
   emitting laser radiation to a target point using a laser;
   acquiring reflected laser radiation from the target point using a receiver having a detection surface;

acquiring, with at least one camera, at least one image of at least one target environment of the target point;

outputting a display of the at least one image overlaid with a marker of the target point on a screen of the laser distance measurement device;

determining an estimated distance to the target point based on a light spot brought about by the reflected laser radiation on the detection surface; and correcting a parallax error in the display of the at least one image overlaid with the marker of the target point based on the estimated distance.

2. The method as claimed in claim 1 further comprising:
determining the estimated distance based on a position of the light spot brought about by the reflected laser radiation on the detection surface.

3. The method as claimed in claim 1 further comprising:
determining the estimated distance based on a size of the light spot brought about by the reflected laser radiation on the detection surface.

4. The method as claimed in claim 3 further comprising:
determining the size of the light spot based on a surface area covered by the light spot on the detection surface.

5. The method as claimed in claim 3 further comprising:
determining the size of the light spot based on a length of a section of a surface area covered by the light spot on the detection surface.

6. The method as claimed in claim 5 the determining the size of the light spot further comprising:
determining the size of the light spot based on a number of illuminated pixels of a pixel row of the detection surface that lies substantially in a parallax plane.

7. The method as claimed in claim 6, wherein the pixel row of the detection surface that lies substantially in the parallax plane runs substantially collinear to a direction of a beam displacement with respect to the detection surface for different distances to the target point.

8. The method as claimed in claim 1 further comprising:
determining the estimated distance based on a radiometric measured value.

9. The method as claimed in claim 8, wherein the radiometric measured value is a signal amplitude of the reflected laser radiation received by the detection surface.

10. The method as claimed in claim 8, wherein the radiometric measured value is a signal-to-noise ratio of the reflected laser radiation received by the detection surface.

11. The method as claimed in claim 1, the correcting the parallax error further comprising:
correcting the parallax error in the display of the at least one image overlaid with the marker of the target point by adjusting a relative position of the at least one image and of the marker with respect to one another.

12. A laser distance measurement device for contactless measurement of a distance to a target point, the laser distance measurement device comprising:
at least one laser configured to emit laser radiation to the target point;
a receiver having a detection surface configured to acquire reflected laser radiation from the target point;
a camera configured to acquire at least one image of at least one target environment of the target point, and
a screen configured to output a display of the at least one image overlaid with a marker of the target point; and
at least one processor configured to (i) determine an estimated distance to the target point based on a light spot brought about by the reflected laser radiation on the detection surface and (ii) correct a parallax error in the display of the at least one image overlaid with the marker of the target point based on the estimated distance.

13. The laser distance measurement device as claimed in claim 12, wherein the detection surface of the receiver is a single-photon avalanche photodiode array.

14. The laser distance measurement device as claimed in claim 12, wherein the laser distance measurement device is a hand-held laser distance measurement device.

* * * * *